United States Patent
Wallace et al.

(10) Patent No.: US 6,847,588 B1
(45) Date of Patent: Jan. 25, 2005

(54) METHOD FOR CHANGING THE FREQUENCY FOR SAMPLING SONAR WAVEFRONTS

(75) Inventors: George Wallace, Granada Hills, CA (US); Paul Greene, Glendale, CA (US)

(73) Assignee: L-3 Communications Corporation, Sylmar, CA (US)

( * ) Notice: Subject to any disclaimer, the term of this patent is extended or adjusted under 35 U.S.C. 154(b) by 0 days.

(21) Appl. No.: 10/802,655

(22) Filed: Mar. 16, 2004

(51) Int. Cl.$^7$ ............................................... G01S 3/80
(52) U.S. Cl. ..................... 367/129; 367/119; 367/124; 367/130
(58) Field of Search ................................. 367/118, 119, 367/124, 129, 130

(56) References Cited

U.S. PATENT DOCUMENTS

| | | | | |
|---|---|---|---|---|
| 4,930,111 A | * | 5/1990 | Sullivan et al. | 367/130 |
| 5,040,157 A | * | 8/1991 | Roderick et al. | 367/119 |
| 5,667,373 A | * | 9/1997 | Wright et al. | 367/124 |

OTHER PUBLICATIONS

Stergiopoulos, Stergios, et al. "Extended Towed Array Processing By an Overlap Correlator." J. Acoust. Soc. Am. 86 (1), Jul. 1989.

Stergiopoulos, Stergios, et al. "Implementation of a Synthetic Aperture Processing Scheme In a Towed Array Sonar System." J. Acoust. Soc. Am., vol. 95, No. 5, Pt. 2, May 1994.

Carey, William M., "Comments On 'Passive Synthetic Arrays' [J. Acoust. Soc. Am. 84, 592–598 (1988)]." J. Acoust. Soc. Am. 85(3), Mar. 1989.

Colin, M.E.G.D., et al. "Passive Synthetic Aperture Sonar Techniques In Combination With Tow Ship Noise Canceling: Application To a Triplet Towed Array." IEEE, 2002.

Kim, Keonwook, et al.; "Parallel Subspace Projection Beamforming For Autonomous, Passive Sonar Signal Processing." High–performance Computing and Simulation (HCS).

* cited by examiner

*Primary Examiner*—Ian J. Lobo
(74) *Attorney, Agent, or Firm*—Roberts & Roberts, LLP

(57) ABSTRACT

A system and method for processing sonar information from an underwater hydrophone array, at frequencies having wavelengths less than two times a spacing between adjacent hydrophones. The method and system all for processing received underwater waveforms at high frequency limits beyond the mechanical limits of the array.

14 Claims, 2 Drawing Sheets

METHOD FOR CHANGING THE FREQUENCY FOR SAMPLING SONAR WAVEFRONTS

BACKGROUND OF THE INVENTION

1. Field of the Invention

The present invention relates to underwater acoustic hydrophone arrays. More particularly to a method for processing received underwater sonar waveforms to thereby raise the high frequency limit of the array.

2. Description of the Related Art

The gathering of data in an acoustic environment by means of an array of electrically interconnected hydrophones is important for commercial and military purposes. Passive sonar arrays have been used for many years in applications such as geologic surveys and submarine detection and tracking. They are essentially an assembly of hydrophones held together by a strength member and moved through water by a platform such as a ship or submarine to detect sound signals in the water. Such sensors are useful for detecting the position of underwater sonar target contacts. Towed arrays of hydrophones are long, continuous, neutrally buoyant hose lines, often several hundred meters long, which periodically contain numerous hydrophone receivers. Typically, these elongated arrays have a number of hydrophone elements in modules or clusters, along with their associated electronics and control leads, contained within the hose-shaped structure that extends through the water. In order to gather data in an ocean environment, one end of a linear hydrophone array is coupled to a navigating vessel. The principle advantages of the towed array are that it is separated from noise generated by the towing platform, allowing for improved detection of low source level signals, and that it can be constructed so that it is significantly longer than the towing platform, allowing for detection of lower frequency signals and for better bearing accuracy.

The individual hydrophones cooperate or interact to provide a beam, which may be steered to determine the bearing from the array of various acoustic targets. The hydrophones are connected to suitable electronics on the towing vessel which indicates the bearing of an identified underwater target. Exemplary towed arrays are described in U.S. Pat. Nos. 4,554,650 and 5,412,621. In locating submerged bodies, sonar is either used passively, through reception of signals sent through water by the target, or actively wherein a pulse of sound is sent into the water by a sonar projector. The sound is then reflected back from the target and detected by the hydrophone arrays as an echo. This echo is received as acoustic energy by an acoustic transducer, converted into electrical energy, and read by a computer on the vessel to determine the location of objects within the water. As shown in U.S. Pat. No. 5,844,860, elongated, hose-like towed arrays of hydrophones attached to the rear end of towed bodies are commonly used for the acoustic sensing of moving objects within the ocean.

In a conventional towed array, the mechanical design of the array limits the array's performance in that both the highest frequency and the lowest frequency that the array can effectively process are determined by the mechanical design itself. The lowest frequency ($f_L$) is determined by the total array length. The $f_L$ is the frequency with half-wavelength ($\lambda/2$) equal to the length of the acoustically active portion of the array. The highest effective frequency ($f_H$) is determined by the spacing between the individual hydrophones. The $f_H$ is the frequency with half-wavelength ($\lambda/2$) equal to the spacing between the hydrophones or hydrophone cluster.

Changes in the array performance, in either the high frequency or the low frequency, require redesigning and remanufacturing of an array which is either longer, to achieve a lower $f_L$, or which has reduced hydrophone spacing, to raise $f_H$. However, solving these problems by merely changing the length of the array or the hydrophone spacing may have consequences which may be undesirable. For instance, raising $f_H$ by reduction in hydrophone spacing increases the array's weight, thus complicating ballasting and buoyancy of the array and increasing the cost. Further, $f_H$ cannot be raised above the limit determined by the physical size of the hydrophone clusters being used. In addition, lowering $f_L$ requires that the acoustically active portion of the array be lengthened, increasing the complexity of the stowing and handling equipment as well as limiting the maneuverability of the towing platform.

Accordingly, the present invention solves the above mentioned problems by providing a method to process the received waveforms over a particular period of time in such a manner that the array performs as if it were synthetically longer or as if the hydrophone spacing were made synthetically shorter, thus synthetically raising the high frequency limit. The telemetry sampling frequency ($f_S$) is chosen based on sampling requirements for the highest effective received frequency $f_H$. Typically $f_S$ is fixed at a multiple of $f_H$ such that the desired signal waveform is adequately represented by the sample.

SUMMARY OF THE INVENTION

The invention provides a method for processing sonar information from an underwater hydrophone array, which array has a known spacing between adjacent hydrophones, at frequencies having wavelengths less than two times a spacing between adjacent hydrophones, the method comprising:

a) providing an underwater hydrophone array comprising a plurality of receiver hydrophones, which array has a known length and known spacing between adjacent hydrophones, wherein $\lambda_{DU}$ is the upper design wavelength for the design upper frequency limit $f_{DU}$ for the array;

b) providing forward motion for the hydrophone array underwater with a vessel at a velocity of the hydrophone array in water $V_S$;

c) selecting a synthetic upper frequency $f_{SU}$, wherein the synthetic upper frequency is equal to or greater than the frequency of a signal to be measured;

d) defining a synthetic hydrophone spacing $\Delta d_{SU}$, wherein the synthetic hydrophone spacing is equal to $\lambda_{SU}/2$ wherein $\lambda_{SU}$ is the wavelength for the synthetic upper frequency $f_{SU}$ for the array;

e) determining the time interval for the hydrophones to travel the distance of the synthetic hydrophone spacing;

f) calculating the number of sonar signal wavefronts predicted to be encountered by each hydrophone in the time interval for the hydrophones to travel the distance of the synthetic hydrophone spacing;

g) selecting a telemetry sampling rate for the predicted number of sonar wavefronts, wherein the telemetry sampling rate is selected such that each wavefront is sampled more than once;

h) detecting samples of a first sonar wavefront with each of the hydrophones at a time $t_0$ and summing and recording the samples at time $t_0$ with a beamformer to provide a plurality of beam sets at a time $t_0$;

i) detecting samples of N subsequent sonar wavefronts with each of the hydrophones at $\geq 2N$ equally spaced times in a time interval $\Delta t$; summing and recording the samples from each of the hydrophones with a beamformer to provide beam sets for the number of samples taken in the time interval $\Delta t$; and j) combining the beam sets into an assembly of beams at a time $t_1 = t_0 + \Delta t$.

The invention also provides a system for processing sonar information from an underwater hydrophone array, which array has a known spacing between adjacent hydrophones, at frequencies having wavelengths less than two times a spacing between adjacent hydrophones, comprising:

a) an underwater hydrophone array comprising a plurality of receiver hydrophones, which array has a known length and known spacing between adjacent hydrophones, wherein $\lambda_{DU}$ is the upper design wavelength for the design upper frequency limit $f_{DU}$ for the array;

b) a driver for providing forward motion for the hydrophone array underwater at a velocity of the hydrophone array in water $V_S$;

c) an arrangement for selecting a synthetic upper frequency $f_{SU}$, wherein the synthetic upper frequency is equal to or greater than the frequency of a signal to be measured;

d) an instrumentality for defining a synthetic hydrophone spacing $\Delta d_{SU}$, wherein the synthetic hydrophone spacing is equal to $\lambda_{SU}/2$ wherein $\lambda_{SU}$ is the wavelength for the synthetic upper frequency $f_{SU}$ for the array;

e) an implement for determining the time interval for the hydrophones to travel the distance of the synthetic hydrophone spacing;

f) a calculator for calculating the number of sonar signal wavefronts predicted to be encountered by each hydrophone in the time interval for the hydrophones to travel the distance of the synthetic hydrophone spacing;

g) a sampler for selecting a telemetry sampling rate for the predicted number of sonar wavefronts, wherein the telemetry sampling rate is selected such that each wavefront is sampled more than once;

h) a detector for detecting samples of a first sonar wavefront with each of the hydrophones at a time to and summing and recording the samples at time $t_0$ with a beamformer to provide a plurality of beam sets at a time $t_0$; and for detecting samples of N subsequent sonar wavefronts with each of the hydrophones at $\geq 2N$ equally spaced times in a time interval $\Delta t$; and for summing and recording the samples from each of the hydrophones with a beamformer to provide beam sets for the number of samples taken in the time interval $\Delta t$; and i) a combiner for combining the beam sets into an assembly of beams at a time $t_1 = t_0 + t$.

DETAILED DESCRIPTION OF THE PREFERRED EMBODIMENT

Figure 1:
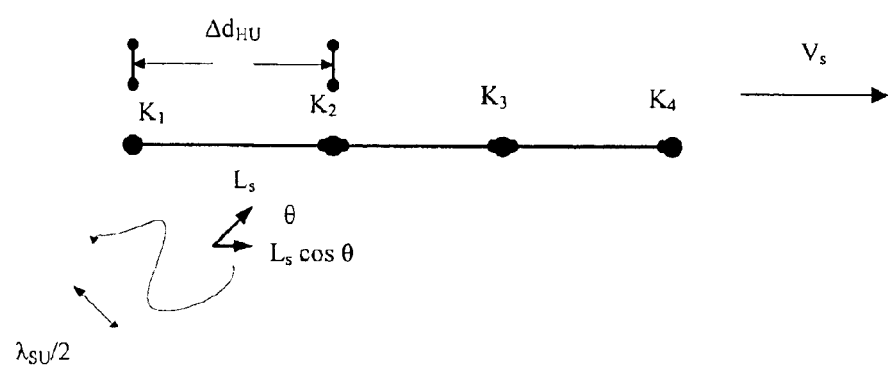
FIG. 1 schematically shows a towed array of hydrophones $K_1$, $K_2$, $K_3$, $K_4$ and an incident wavefront at angle with the array $\theta$.

According to the present invention, a computer is input with a selected high frequency limit $f_H$. The high frequency limit is determined by the upper limit of the frequency range that contains the signal of interest. Thus, if the signal of interest is bounded by the interval of 1 kHz to 6 kHz, 6 kHz might be selected as the high frequency limit $f_H$. No mechanical design parameter, such as hydrophone spacing, is used in selecting $f_H$ since $f_H$ is an operational parameter rather than a design parameter. It may be changed at any time in response to changing requirements.

The speed of sound through water $L_S$ is sampled and input into a computer. Likewise, the velocity of the array through the water $V_S$ is sampled and input into the computer. Vs is a vector quantity so that a magnitude and direction are input to adequately define it.

With $f_H$ selected and $L_S$ measured, the half wavelength $\lambda/2$ can be calculated. The distance $\lambda/2$ is the maximum distance between samples that will adequately replicate the incoming waveform. Set $f_{su} = f_h$.

The time interval $\Delta t$ that the individual hydrophone takes to "sweep out" the distance $\lambda/2$ is calculated using the array's measured velocity $V_S$. The time interval $\Delta t$ is subdivided into N intervals where N is the number of wave fronts of frequency $f_H$ that the hydrophone encounters over the time interval $\Delta t$.

The telemetry sampling frequency $f_S$ is set to at least twice the high frequency limit $f_H$ such that data is sampled as each wave front encounters the hydrophone. Since the hydrophone has moved the distance $(\Delta t * V_S)/N$, the sampling frequency $f_S$ is set in this manner so that two things are accomplished. First, each waveform is sampled more than once as it passes the hydrophone. This allows rejection of non-coherent noise in subsequent processing of the synthetic waveform when the waveforms are combined over the interval $\Delta t$. Second, since the hydrophone movement between samples is proportionate to the wavelength for $f_H$, the coherent signal waveform is sampled N times over the distance $\lambda/2$. Thus the synthetic waveform is described at N points along the interval $(0, \lambda/2)$.

At the beginning $t_0$ of each interval $\Delta t$, a sample is taken at each hydrophone in the array. The samples are summed in a beamformer to provide a composite family of output signals (beam sets). These beam sets are recorded and stored. The process is repeated N equally spaced times. At the completion of N samples over the time interval $\Delta t$, the array has traveled $\lambda/2$ distance from the initial point. The database contains N families of beam sets, one from each of the N sample periods along the interval.

A transpositional function is applied to each of the N beam sets that "moves" it forward to position $\lambda/2$ and time $t_1 = t_0 + \Delta t$. The transposed data is combined so that all the beam sets taken over the interval are combined into one data family composed of beams that are synthesized at time $\Delta t$.

The transposed signals constitute a synthesized waveform made up of the N waveforms sampled at each time over the interval $\Delta t$. The output is a single synthesized waveform that would appear like a single wave front encountered at position $0 + \lambda/2$ and at time $t_1$. Only coherent signal that was present in each wave front encountered in each of the N samples would be present in the synthetic wave front. Non-coherent signal (noise), since by its non-coherent nature only appears in one of the N samples, does not appear in the synthetic waveform. Thus the signal to noise ratio SNR of the synthetic signal is improved over the natural signal.

One application of this method and system might be for a towed array used to detect a submerged submarine. As an example, if the particular towed array is built with a mechanical upper frequency of 1 kHz (hydrophone spacing of 2.4 ft) is to be used to search for a submarine that emanates a signal in the range of 1 to 4 kHz, the upper frequency would be selected to cover the frequency band of interest by first selecting an $f_H$ of 4 kHz. The speed of sound in the water $L_S$ is measured as 4800 ft/sec and array velocity $V_S$ is measured at 5 knots in a direction of North. The half wavelength $\lambda/2$ is calculated as 0.6 ft. N is thus 480 and the time interval $\Delta t$ is 0.0718 sec. The distance 0.6 ft and time 0.0718 sec are divided into 480 separate, equal intervals with a sample point at the beginning of each interval. Signal data is collected at each sample point, processed through a beamformer, and transposed to a position 0.6 ft from the start point and 0.0718 seconds from the start time. The synthetic waveform is assembled at that point and analyzed for signals of interest.

The Theory

The array movement is used to "sweep out" the interval spacing between hydrophones, thus synthesizing a higher hydrophone density and closer hydrophone spacing. Since the array hardware upper design frequency $f_{DU}$ for a particular towed array is based on having the hydrophone spacing equal to the half wavelength $\lambda_{DU}/2$ for that $f_{DU}$, the concept of synthetically generating hydrophone density raises the upper frequency limit for the array above the mechanical design limit.

If an array is designed with hydrophone spacing $\Delta d_{DU}$, then the conventional array hardware upper design frequency $f_{DU}$ would satisfy the equation:

$$f_{DU} = L_S / \Delta d_{DU}$$

wherein: $L_S$ = the speed of sound in water $$\Delta d_{DU} = \lambda_{DU}/2$$

The sampling frequency $f_S$ is a multiple of $f_{DU}$, and selected so that adequate data is sampled. A number of 2.5 times $f_{DU}$ is a typical value. With the conventional approach, raising $f_{DU}$ entails lowering $\Delta d_{DU}$, i.e. adding hydrophones to the array. For a given array length, doubling the upper design frequency $f_{DU}$ requires halving the hydrophone spacing $\Delta d_{DU}$, thus doubling the hydrophone population.

Likewise, since the design frequency $f_{DU}$ doubled, the sampling frequency $f_S$ would also require doubling, usually entailing a change to the telemetry system.

The array's movement through the water is utilized to sample data at discrete intervals. The data is processed by standard beamforming techniques and "transposed" by mathematical means such that the all samples are taken over the interval $\Delta t$, where $\Delta t$ is defined by the interval $t_0$ to $t_1$, is transposed to time $t_1$. Careful selection of the discrete interval allows the increase in the subsequent synthetic upper frequency $f_{SU}$ by an integer multiple of the array hardware design upper frequency $f_{DU}$, such that:

$$f_{SU} = A * f_{DU} \text{ where A=the desired integer multiple}$$

Referring to FIG. 1, there is shown a towed array of hydrophones $K_1$, $K_2$, $K_3$, $K_4$ and an incident wavefront at angle with the array $\theta$.

The $f_{SU}$ is a function of the hydrophone spacing $\Delta d_{HU}$, array velocity $V_S$, and the incident angle of the wavefront with the array $\theta$.

wherein:

$L_S$ = speed of sound in water
$V_S$ = towed array velocity
$\theta$ = incident angle of wave front
$K_N$ = hydrophone at position N
$\Delta d_{HU}$ = design hydrophone spacing = $\lambda_{FU}/2$ for $f_{DU}$
$\lambda_{SU}/2$ = half wavelength for synthetic upper frequency $f_{SU}$ If we define a synthetic hydrophone spacing $\Delta d_{SU}$ such that $\Delta d_{SU}$ is equal to $\lambda_{SU}/2$ for $f_{SU}$, then: $\Delta d_{SU} = V_S \Delta t$ where $\Delta t$ is the time interval for the hydrophone to travel the distance $\Delta d_{SU}$. Since $\Delta d_{SU} = \lambda_{SU}/2$ where $\lambda_{SU}/2$ is the half wavelength for the synthetic upper frequency, then $\Delta t = \lambda_{SU}/(2 V_s)$.

In the time interval $\Delta t$, the number of wave fronts passing the hydrophone $K_N$ as the hydrophone travels from position $X_0$ to position $X_{\lambda/2}$ at speed $V_s$, would be defined by:

$$L_S \cos \theta = (N_X \lambda_{SU} + \lambda_{SU}/2)/\Delta t$$

wherein $N_x$ = integer number of wave fronts passing hydrophone $K_N$ in time $\Delta t$.

$$L_S \cos \theta = [\lambda_{SU}/2(2N_X+1)]/[\lambda_{SU}/(2 V_S)]$$

$$2N_X + 1 = L_S \cos \theta / V_S$$

Thus: $N_x = \frac{1}{2}[(L_S \cos \theta / V_S) - 1]$

Hydrophone $K_N$ would sample the wave train at the $\lambda_{su}/2$ position on the $N^{th}$ wave of the train. Using conventional sampling theory, $f_{SH} = f_{SU}/N$, a very small number of samples would be taken. But, if samples are taken at each $N_X$ over the interval $t = (0, \Delta t)$ then $f_{SH} = f_{SU}$ where $f_{SH}$ is a highly oversampled space such that each wave form is sampled as it passes the hydrophone $K_X$ at the position $X_n = d\Delta d_{SU}/N$. Thus the wave train is sampled sequentially such that each subsequent wave in the train is sampled at a position over the interval $(0, \lambda_{SU}/2)$ such that $X_n = n\lambda_{SU}/2N$.

The conventional time domain beamforming equation can be written as:

$$A_r(t) = \sum_{K=0}^{K=Z-1} W_K f_K(t + \tau_{K,r})$$

wherein: Z = the number of hydrophones in the array
$W_K$ = shading factor
$\tau_{K,r}$ = time delay applied to the $K^{th}$ element data for the $r^{th}$ beam With synthetic beamforming, the beamforming at each position $X_N$ would be:

$$A_r(t)_X = \sum_{K=0}^{K=Z-1} W_K f_K(t + \tau_{K,r,x})$$

wherein: $\tau_{K,r,x}$ = time delay applied to the $K^{th}$ element data for the $r^{th}$ beam at position $X_N$.

Over the sampling time interval $(0, \Delta t)$, this results in a family of N beam sets, with each set identified with a particular time $t_n$ and position $X_n$ that is contained with in the intervals $(0, \Delta t)$ and interval $(0, \lambda_{SU}/2)$. The beam sets are then transposed such that the composite beam set is formed at position $X_N$ and at time $\Delta t$. Thus, the composite time domain beamforming equation takes the form:

$$A_r(t) = \sum_{X=0}^{X=N} f_X(\psi_{K,r,x}) \sum_{K=0}^{K=Z-1} W_K f_K(t + \tau_{K,r,x})$$

Where: $\psi_{K,r,X}$ = transpositional function applied to the $K^{th}$ element data for the $r^{th}$ beam at the $X^{th}$ position.

The system according to the invention comprises the underwater hydrophone array which is known in the art. The hydrophones of the array may be individual hydrophones or may be clusters of hydrophones. Hydrophone clusters may be arranged linearly or grouped in various geometric arrangements such as spherical, planar, conformal to the vessel. The hydrophone spacings for purposes of this invention are measured from the midpoint of one hydrophone cluster to the midpoint of the adjacent hydrophone cluster. The system includes a driver for providing forward motion for the hydrophone array underwater. The driver is typically a surface ship or a submarine. The array may be attached to the outer surface of the hull of the vessel, or it may be towed directly by the vessel, or it may be towed by the vessel via an intermediate platform. The system then includes an arrangement for selecting a synthetic upper frequency. Typically, such an arrangement comprises a determination of the bounds of the frequency of the sonar signal to be measured. These bounds are usually known to those skilled in the art. The synthetic upper frequency is selected to be equal to or greater than the upper bounds of the sonar signal to be measured by means of either manual input or by means of a computer algorithm.

The system then includes an instrumentality for defining a synthetic hydrophone spacing. Typically, such an instrumentality comprises a computer algorithm that takes input of the synthetic upper frequency and calculates the half wavelength for that frequency. The algorithm then sets the synthetic hydrophone spacing equal to the half wavelength.

The system then includes an implement for determining the time interval for the hydrophones to travel the distance of the synthetic hydrophone spacing. Typically, such an implement comprises a computer algorithm that takes as input the synthetic hydrophone spacing and a physical means for measuring the array velocity through the water. The computer algorithm calculates the time interval for the hydrophone to travel the synthetic hydrophone spacing.

The system then includes a calculator for calculating the number of sonar signal wavefronts predicted to be encountered by each hydrophone in the time interval for the hydrophones to travel the distance of the synthetic hydrophone spacing. Typically, such a calculator comprises a computer algorithm that calculates the number of wavefronts encountered by the hydrophone during the time interval for each of a family of expected incident angles $\theta$.

The system then includes a sampler for selecting a telemetry sampling rate for the predicted number of sonar wavefronts. Typically, such a sampler comprises a computer algorithm that takes as input the number of expected sonar signal wavefronts for the case of the limiting incident angle $\theta$. The computer algorithm also takes as input the number of samples per wavefront that has been chosen. The algorithm calculates the sample rate and outputs that value to the control function for the telemetry to sample the sonar signal.

The system then includes a detector for detecting samples of a sonar wavefront with each of the hydrophones and summing and recording the samples with a beamformer to provide beam sets. Typically, such a detector comprises a plurality of hydrophones that convert the sonar signal to electrical energy. The telemetry system samples the electrical energy at discrete times. The samples are combined and transformed in the beamformer.

The system then includes a combiner for combining the beam sets into an assembly of beams. Typically, such a combiner comprises a computer algorithm that calculates the transformation and transposition functions to combine the beams formed during the time interval $\Delta t$ at time $t_1$ in position $\Delta t_{SU}$.

The following non-limiting examples serve to illustrate the invention. It will be appreciated that variations in proportions and alternatives in elements of the components of the invention will be apparent to those skilled in the art and are within the scope of the present invention.

EXAMPLE 1

This examples illustrates a method for determining a variable sample rate, dependent on array velocity and selected upper synthetic frequency. An upper synthetic frequency is chosen and a synthetic hydrophone spacing is calculated. The array velocity is used to calculate a time period needed for the hydrophone to travel the synthetic hydrophone distance. The number of sonar wave fronts encountered by the hydrophone during the time period is calculated. The sample rate is then calculated based on the number of wave fronts and the time period. A linear array is built with eight hydrophone groups equally spaced such that the array is 10.5 meters in length. The array is designed with a spacing between hydrophones of 1.5 meters. Since the upper design frequency $F_{DU}=L_S/\Delta d_{DU}$ and the speed of sound through the water $L_S$ equals 1500 meters/sec, then $F_{DU}$ equals 500 Hz.

The sonar signal to be measured is in the range of 500 to 1000 Hz. To raise the frequency capability of this array to 1000 Hz, select a synthetic upper frequency equal to two times the $f_{DU}$. $f_{SU}=A*f_{DU}$ with A=2. The synthetic hydrophone spacing $\Delta d_{SU}$ is set equal to the half wavelength $\lambda/2$ for $F_{SU}$. $\lambda/2=L_S/2$ $F_{SU}$ so $\lambda/2$ and $\Delta d_{SU}$ are equal to 0.75 meters.

Figure 2:
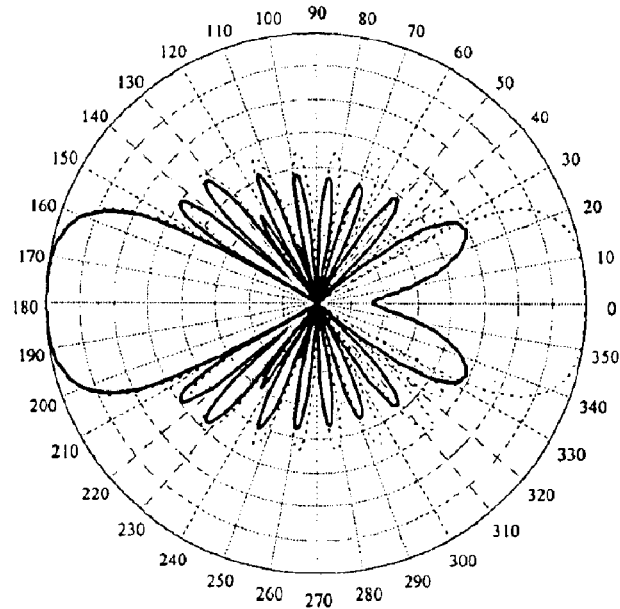
FIG. 2 shows a polar plot of the resulting beam set for a sonar wave front arriving from the 180 degree position according to Example 1.

If the array is moved through the water at 10 knots (5.14 meters/sec) and $\Delta d_{SU}=V_S\Delta t$ then the time for a hydrophone to move from its position at time $t_0$ a distance equal to $\Delta d_{SU}$ is $\Delta t=0.1459$ seconds. To determine the number of wave fronts N the hydrophone will encounter over the time interval $\Delta t$, the equation $N=\frac{1}{2}[(L_S \cos \theta/V_S)-1]$ is solved for $\cos \theta=1$, the limiting case. N=145 wave fronts encountered. The sample rate SR is then $2N/\Delta t=1994$ samples per second. A transpositional function is applied to each of the beam sets that "moves" it forward to position $\lambda/2$ and time $\Delta t$. The transposed data is combined so that all the beam sets taken over the interval are combined into one data family composed of beams that are synthesized at time $\Delta t$. FIG. 2 shows a polar plot of the resulting beam set for a sonar wave front arriving from the 180 degree position.

EXAMPLE 2

In this example, a synthetic upper frequency of four times the design upper frequency is chosen. A linear array is built with hydrophone groups equally spaced such that the array is 105 meters in length. The array is designed with a spacing between hydrophone of 15 meters. Since the upper design frequency $f_{DU}=L_S/\Delta d_{DU}$ and the speed of sound through the water $L_S$ equals 1500 meters/sec, then $f_{DU}$ equals 50 Hz. The sonar signal to be measured is in the range of 150 to 200 Hz. To raise the frequency capability of this array to 200 Hz, select a synthetic upper frequency equal to two times the $f_{DU}$. $f_{SU}=A*F_{DU}$ with A=4. The synthetic hydrophone spacing $\Delta d_{SU}$ is set equal to the half wavelength $\lambda/2$ for $f_{SU}$. $\lambda/2=L_S/2$ $F_{SU}$ so $\lambda/2$ and $\Delta d_{SU}$ are equal to 3.75 meters. If the array is moved through the water at 15 knots (7.71 meters/sec) and $\Delta d_{SU}=V_S\Delta t$ then the time for a hydrophone to move from its position at time to a distance equal to $\Delta d_{SU}$ is $\Delta t=0.486$ seconds. To determine the number of wave fronts N the hydrophone will encounter over the time interval $\Delta t$, the equation $N=\frac{1}{2}[(L_S \cos \theta/V_S)-1]$ is solved for $\cos \theta=1$, the limiting case. N=97 wave fronts encountered. The sample rate SR is then $2N/\Delta t=398.2$ samples per second. A transpositions function is applied to each of the beam sets that "moves" it forward to position $\lambda/2$ and time $\Delta t$. The transposed data is combined so that all the beam sets taken over the interval are combined into one data family composed of beams that are synthesized at time $\Delta t$. A polar plot of the resulting beam set for a sonar wave front arriving from the 180 degree position is similar to that of FIG. 2.

EXAMPLE 3

A method for using a fixed sample rate is shown. An upper synthetic frequency is chosen and a synthetic hydrophone spacing is calculated. The array velocity is used to calculate a time period needed for the hydrophone to travel the synthetic hydrophone distance. The sample point nearest the synthetic hydrophone point is chosen and the distance between the two is calculated. An error function is calculated and applied to the sonar signal. A linear array is built with eight hydrophone groups equally spaced such that the array is 10.5 meters in length. The array is designed with a spacing between hydrophone groups of 1.5 meters. Since the upper design frequency $f_{DU}=L_S/\Delta d_{DU}$ and the speed of sound through the water $L_S$ equals 1500 meters/sec, then $f_{DU}$ equals 500 Hz. The system has a sample rate of 3,000 samples per second. The sonar signal to be measured is in the range of 500 to 1000 Hz. To raise the frequency capability of this array to 1000 Hz, select a synthetic upper frequency equal to two times the $f_{DU}$. $f_{SU}=A*f_{DU}$ with A=2. The synthetic hydrophone spacing $\Delta d_{SU}$ is set equal to the half wavelength $\lambda/2$ for $f_{SU}$. $\lambda/2=L_S/2$ $F_{SU}$ so $\lambda/2$ and $\Delta d_{SU}$ are equal to 0.75 meters. If the array has a velocity $V_S$ through the water of 10 knots (5.14 meters/sec) and $\Delta d_{SU}=V_S\Delta t$ then the time for a hydrophone to move from its position at time $t_0$ a distance equal to $\Delta d_{SU}$ is $\Delta t=0.1459$ seconds. The number of samples available during the time period that the hydrophone travels the synthetic hydrophone distance $\Delta d_{SU}$, given that SR=3000, is equal to the sample rate times $\Delta t$. Thus N=round(SR*$\Delta t$)=437. The sample taken nearest the synthetic hydrophone point is taken at a distance from the origin equal to $(NS*V_S)/SR=0.7493$ meters. Thus there is a 0.0007 meter error between the sample point and the synthetic hydrophone distance. The time difference between the two positions $1.36*10^{-5}$ is applied as an error correction. The correction factor is a positive value if the sample point is less than synthetic hydrophone point or negative if the sample point is greater than the synthetic hydrophone point.

This method further allows for corrections for measured speed. Assume that the actual array velocity $V_A$ through the water is 9 knots (4.63 meters/second) when the measured velocity $V_S$ is 10 knots. The sample taken nearest the synthetic hydrophone point is taken at a distance from the origin equal to $(NS*V_A)/SR=0.6751$ meters. Thus there is a 0.0749 meter error between the sample point and the synthetic hydrophone distance. The time difference between the two positions $1.62*10^{-2}$ is applied as an error correction.

A transpositional function is applied to each of the beam sets that "moves" it forward to position $\lambda/2$ and time $\Delta t$. The transposed data is combined so that all the beam sets taken over the interval are combined into one data family composed of beams that are synthesized at time $\Delta t$. A polar plot of the resulting beam set for a sonar wave front arriving from the 180 degree position is similar to FIG. 2.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A method for processing sonar information from an underwater hydrophone array, which array has a known spacing between adjacent hydrophones, at frequencies having wavelengths less than two times a spacing between adjacent hydrophones, the method comprising:

a) providing an underwater hydrophone array comprising a plurality of receiver hydrophones, which array has a known length and known spacing between adjacent hydrophones, wherein $\lambda_{DU}$ is the upper design wavelength for the design upper frequency limit $f_{DU}$ for the array;

b) providing forward motion for the hydrophone array underwater with a vessel at a velocity of the hydrophone array in water $V_S$;

c) selecting a synthetic upper frequency $f_{SU}$, wherein the synthetic upper frequency is equal to or greater than the frequency of a signal to be measured;

d) defining a synthetic hydrophone spacing $\Delta d_{SU}$, wherein the synthetic hydrophone spacing is equal to $\lambda_{SU}/2$ wherein $\lambda_{SU}$ is the wavelength for the synthetic upper frequency $f_{SU}$ for the array;

e) determining the time interval for the hydrophones to travel the distance of the synthetic hydrophone spacing;

f) calculating the number of sonar signal wavefronts predicted to be encountered by each hydrophone in the time interval for the hydrophones to travel the distance of the synthetic hydrophone spacing;

g) selecting a telemetry sampling rate for the predicted number of sonar wavefronts, wherein the telemetry sampling rate is selected such that each wavefront is sampled more than once;

h) detecting samples of a first sonar wavefront with each of the hydrophones at a time $t_0$ and summing and recording the samples at time $t_0$ with a beamformer to provide a plurality of beam sets at a time $t_0$;

i) detecting samples of N subsequent sonar wavefronts with each of the hydrophones at $\geq 2N$ equally spaced times in a time interval $\Delta t$; summing and recording the samples from each of the hydrophones with a beamformer to provide beam sets for the number of samples taken in the time interval $\Delta t$; and j) combining the beam sets into an assembly of beams at a time $t_1=t_0+\Delta t$.

2. The method according to claim 1, wherein step c) comprises selecting a synthetic upper frequency such that the synthetic upper frequency is an integer multiple of the hydrophone array design upper frequency limit $f_{DU}$.

3. The method according to claim 1, wherein step c) comprises selectively varying the synthetic upper frequency.

4. The method according to claim 1, wherein step f) comprises determining an incident angle of the wavefronts with the array $\theta$, and the speed of sound in water $L_S$, and determine the number of wavefronts N according to the equation $$N=\tfrac{1}{2}[(L_S \cos \theta/V_S)-1].$$

5. The method according to claim 1, wherein step g) comprises selecting a variable telemetry sampling rate.

6. The method according to claim 1, wherein step g) comprises:

i) calculating a time error between the time when each hydrophone reaches $\lambda_{SU}/2$ for the synthetic hydrophone spacing and the nearest wavefront sampling time; and ii) applying a correction factor for the time error for correcting a time delay, and moving the resulting combined beam to a position which corrects for the time error.

7. The method according to claim 1 comprising:

a) providing a towed underwater hydrophone array comprising a plurality of receiver hydrophones, which array has a fixed length and a fixed spacing between adjacent hydrophones, each spacing being fixed at a distance equal to $\Delta d_{DU} = \lambda_{DU}/2$ wherein $\lambda_{DU}$ is the upper design wavelength for the upper design frequency limit $f_{DU}$ for the array, wherein $f_{DU} = L_S/\Delta d_{DU}$ wherein $L_S$=the speed of sound in the water;

b) towing the array underwater with a vessel at a velocity of the hydrophone array in water $V_S$;

c) selecting a synthetic upper frequency $f_{SU} = A*f_{DU}$, wherein A is an integer;

d) defining a synthetic hydrophone spacing $\Delta d_{SU} = \lambda_{SU}/2$ wherein $\lambda_{SU}$ is the upper synthetic wavelength for the synthetic upper frequency $f_{SU}$ for the array;

e) determining the time interval $\Delta t$ for the hydrophones to travel the distance $\Delta d_{SU}$ wherein $\Delta t = \lambda_{SU}/(2*V_S)$;

f) calculating the number of wavefronts N encountered by each hydrophone in time interval $\Delta t$ by the equation $$N = \tfrac{1}{2}[(L_S \cos \theta/V_S) - 1]$$

wherein $\theta$=the incident angle of the wavefronts with the array.

8. A system for processing sonar information from an underwater hydrophone array, which array has a known spacing between adjacent hydrophones, at frequencies having wavelengths less than two times a spacing between adjacent hydrophones, comprising:

a) an underwater hydrophone array comprising a plurality of receiver hydrophones, which array has a known length and known spacing between adjacent hydrophones, wherein $\lambda_{DU}$ is the upper design wavelength for the design upper frequency limit $f_{DU}$ for the array;

b) a driver for providing forward motion for the hydrophone array underwater at a velocity of the hydrophone array in water $V_S$;

c) an arrangement for selecting a synthetic upper frequency $f_{SU}$, wherein the synthetic upper frequency is equal to or greater than the frequency of a signal to be measured;

d) an instrumentality for defining a synthetic hydrophone spacing $\Delta d_{SU}$, wherein the synthetic hydrophone spacing is equal to $\lambda_{SU}/2$ wherein $\lambda_{SU}$ is the wavelength for the synthetic upper frequency $f_{SU}$ for the array;

e) an implement for determining the time interval for the hydrophones to travel the distance of the synthetic hydrophone spacing;

f) a calculator for calculating the number of sonar signal wavefronts predicted to be encountered by each hydrophone in the time interval for the hydrophones to travel the distance of the synthetic hydrophone spacing;

g) a sampler for selecting a telemetry sampling rate for the predicted number of sonar wavefronts, wherein the telemetry sampling rate is selected such that each wavefront is sampled more than once;

h) a detector for detecting samples of a first sonar wavefront with each of the hydrophones at a time $t_0$ and summing and recording the samples at time $t_0$ with a beamformer to provide a plurality of beam sets at a time $t_0$; and for detecting samples of N subsequent sonar wavefronts with each of the hydrophones at $\geq 2N$ equally spaced times in a time interval $\Delta t$; and for summing and recording the samples from each of the hydrophones with a beamformer to provide beam sets for the number of samples taken in the time interval $\Delta t$; and i) a combiner for combining the beam sets into an assembly of beams at a time $t_1 = t_0 + \Delta t$.

9. The system according to claim 8, wherein the arrangement c) comprises a selector for selecting a synthetic upper frequency such that the synthetic upper frequency is an integer multiple of the hydrophone array design upper frequency limit $f_{DU}$.

10. The system according to claim 8, wherein the arrangement c) comprises a selector for selectively varying the synthetic upper frequency.

11. The system according to claim 8, wherein the calculator f) comprises a determiner for determining an incident angle of the wavefronts with the array $\theta$, and the speed of sound in water $L_S$, and determine the number of wavefronts N according to the equation $$N = \tfrac{1}{2}[(L_S \cos \theta/V_S) - 1].$$

12. The system according to claim 8, wherein sampler is capable of selecting a variable telemetry sampling rate.

13. The system according to claim 8, wherein sampler g) is capable of calculating a time error between the time when each hydrophone reaches $\lambda_{SU}/2$ for the synthetic hydrophone spacing and the nearest wavefront sampling time; and applying a correction factor for the time error for correcting a time delay, and moving the resulting combined beam to a position which corrects for the time error.

14. The system according to claim 8 comprising:

a) an underwater hydrophone array comprising a plurality of receiver hydrophones, which array has a fixed length and an equal fixed spacing between adjacent hydrophones, each spacing being fixed at a distance equal to $\Delta d_{DU} = \lambda_{DU}/2$ wherein $\lambda_{DU}$ is the upper design wavelength for the upper design frequency limit $f_{DU}$ for the array, wherein $f_{DU} = Ls/\Delta d_{DU}$ wherein $L_S$=the speed of sound in the water;

b) a driver for towing the array underwater with a vessel at a velocity of the hydrophone array in water $V_S$;

c) an arrangement for selecting a synthetic upper frequency $f_{SU} = A*f_{DU}$, wherein A is an integer;

d) an instrumentality for defining a synthetic hydrophone spacing $\Delta d_{SU} = \lambda_{SU}/2$ wherein $\lambda_{SU}$ is the wavelength for the synthetic upper frequency $f_{SU}$ for the array;

e) an implement for determining the time interval $\Delta t$ for the hydrophones to travel the distance $\Delta_{SU}$ wherein $\Delta t = \lambda_{SU}/(2*Vs)$;

f) a calculator for calculating the number of wavefronts N encountered by each hydrophone in time interval $\Delta t$ by the equation $$N = \tfrac{1}{2}[(L_S \cos \theta/V_S) - 1]$$

wherein $\theta$=the incident angle of the wavefronts with the array.

* * * * *